US009623462B2

(12) United States Patent
Paupy et al.

(10) Patent No.: US 9,623,462 B2
(45) Date of Patent: Apr. 18, 2017

(54) METHOD FOR REDUCING PIPE OVALITY

(71) Applicant: TECHNIP FRANCE, Courbevoie (FR)

(72) Inventors: Laurent Frank Paupy, Houston, TX (US); Fabien Anne, Houston, TX (US); Mathieu Boisne, Houston, TX (US); Eric Christopher Keith, Brookshire, TX (US)

(73) Assignee: TECHNIP FRANCE, Courbevoie (FR)

( * ) Notice: Subject to any disclaimer, the term of this patent is extended or adjusted under 35 U.S.C. 154(b) by 255 days.

(21) Appl. No.: 14/513,366

(22) Filed: Oct. 14, 2014

(65) Prior Publication Data
US 2016/0101453 A1 Apr. 14, 2016

(51) Int. Cl.
B21D 39/04 (2006.01)
B21D 3/16 (2006.01)
F16L 57/00 (2006.01)
F16L 1/12 (2006.01)
F16L 1/20 (2006.01)
F16L 13/02 (2006.01)
F16L 13/04 (2006.01)
F16L 25/00 (2006.01)

(52) U.S. Cl.
CPC ............ *B21D 3/16* (2013.01); *B21D 39/046* (2013.01); *F16L 1/12* (2013.01); *F16L 1/20* (2013.01); *F16L 13/02* (2013.01); *F16L 13/04* (2013.01); *F16L 57/005* (2013.01); *F16L 25/0018* (2013.01); *Y10T 29/4981* (2015.01)

(58) Field of Classification Search
CPC ........... Y10T 29/49968; Y10T 29/4981; Y10T 29/53917; B21D 39/046; F16L 13/0209; F16L 25/0018; B23K 2201/10; B23K 2201/106
See application file for complete search history.

(56) References Cited

U.S. PATENT DOCUMENTS

| 3,747,386 A | 7/1973 | Hartkopf |
| 3,768,269 A | 10/1973 | Broussard et al. |
| 4,080,799 A | 3/1978 | Nanny |
| 4,364,692 A | 12/1982 | Kyriakides et al. |

FOREIGN PATENT DOCUMENTS

| FR | 1403454 A | 6/1965 |
| FR | 2928438 A1 | 9/2009 |
| GB | 2511773 A | 9/2014 |

OTHER PUBLICATIONS

International Search Report and Written Opinion, International Application No. PCT/US2015/055248, Jan. 11, 2016, 9 pages.

*Primary Examiner* — Jermie Cozart
(74) *Attorney, Agent, or Firm* — Jackson Walker L.L.P.

(57) ABSTRACT

The present disclosure provides a method for reducing ovality in pipe for joining to pipe components by using a plug coupled on an inside surface of the pipe and a sacrificial component coupled to the end of the pipe to establish a coupling interface. The plug, the sacrificial component, or a combination thereof assists in minimizing ovality changes during use of the pipe, particularly at the end of the pipe. When the pipe is to be coupled with a pipe component, the pipe and sacrificial component are separated at a different location than the coupling interface along the pipe in proximity to the plug. The plug is left coupled to the sacrificial component, and generally slidably engaged with the pipe. The plug and the sacrificial component can be removed from engagement with the pipe. The pipe and the pipe component can be coupled together.

7 Claims, 3 Drawing Sheets

METHOD FOR REDUCING PIPE OVALITY

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to the joining of pipe ends. Specifically, the disclosure relates to the joining of pipe have restrictions on relative ovality.

Description of the Related Art

Joining ends of pipe with other pipe or components requires a certain amount of is interface material on the ends to be able to adequately join end to end, typically by welding. A mismatch of the ends is measured through an inside cross-sectional dimension, outside cross-sectional dimension, or wall thickness, and ovality or roundness. FIG. 1 is a schematic illustrating a prior art set of mismatched pipes due to ovality. A first pipe 2 that has been stressed in handling such as on a pipe reel for offshore applications can develop ovality in the circumference. In contrast, a new pipe 4 (or other component) that has not been stressed in the same manner may have the intended circular shape as originally manufactured. Due to certain guidelines and regulations, there is a maximum ovality tolerance for joining the different pipes, depending on the conditions to obtain the structural requirements needed for the joining. If the ovality mismatch between the pipes is too large, then field replacement may not be possible with existing pipe since most if not all of the field pipe has been ovalized on the pipe reel.

A typical ovality issue in offshore installations occurs with reeled pipe, such as coiled pipe. As the reeled pipe is unwound to attach pipe or other components to the end of the reeled pipe, the components are generally welded together. Because the reeled pipe has outside compressive forces that cause ovality, which unreeled pipe or components do not have, then the ovality mismatch can occur at the joint. The ovality tolerances can be important to maintaining structural integrity and reduce fatigue and failure during the normal life of the pipe.

There remains then a need to manage pipe ovality to reduce correction and especially field correction.

BRIEF SUMMARY OF THE INVENTION

The present disclosure provides a method for reducing ovality in pipe for joining to pipe components by using a plug coupled on an inside surface of the pipe and a sacrificial component coupled to the end of the pipe to establish a coupling interface. The plug, the sacrificial component, or a combination thereof assists in minimizing ovality changes during is use of the pipe, particularly at the end of the pipe. When the pipe is to be coupled with a pipe component, the pipe and sacrificial component are separated at a different location than the coupling interface along the pipe in proximity to the plug. The plug is left coupled to the sacrificial component, and generally slidably engaged with the pipe. The plug and the sacrificial component can be removed from engagement with the pipe. The pipe and the pipe component can be coupled together.

The invention discloses a method for reducing ovality changes in a pipe for coupling with a pipe component, the pipe having a plug inserted into a pipe end and fixedly coupled to the pipe at a coupling distance from the pipe end and the pipe further having a sacrificial component coupled to the end of the pipe, the method comprising separating a portion of the pipe from the sacrificial component at a greater distance than the coupling distance, thereby transferring the coupling of the plug with the pipe independently of the sacrificial component to a coupling with the sacrificial component independently of the pipe; and removing the plug coupled with the sacrificial component out of an inside of the pipe.

DETAILED DESCRIPTION

Figure 1:
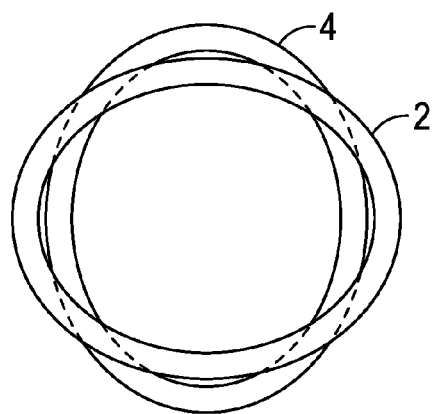
FIG. 1 is a schematic illustrating a prior art set of mismatched pipes.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "B" to designate various members of a given class of an element. When referring generally to such elements, the number without the letter can be used. Further, such designations do not limit the number of members that can be used for that function.

The present disclosure provides a method for reducing ovality in pipe for joining to pipe components by using a plug coupled on an inside surface of the pipe and a sacrificial component coupled to the end of the pipe to establish a coupling interface. The plug, the is sacrificial component, or a combination thereof assists in minimizing ovality changes during use of the pipe, particularly at the end of the pipe. When the pipe is to be coupled with a pipe component, the pipe and sacrificial component are separated at a different location than the coupling interface along the pipe in proximity to the plug. The plug is left coupled to the sacrificial component, and generally slidably engaged with the pipe. The plug and the sacrificial component can be removed from engagement with the pipe. The pipe and the pipe component can be coupled together.

Figure 2:
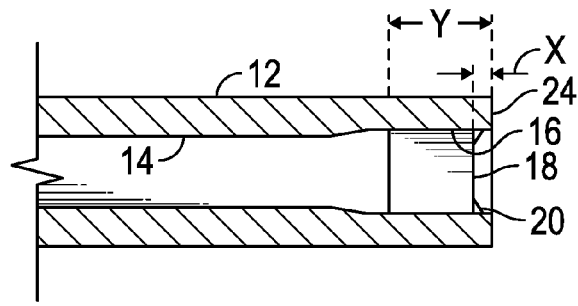
FIG. 2 is a cross-sectional schematic view of an exemplary system of the present invention showing a pipe.

FIG. 2 is a cross-sectional schematic view of an exemplary system of the present invention showing a pipe. An ovality control system 10 generally includes a pipe 12 having an internal bore 14. An end 24 of the pipe 12 can be formed either in the manufacturing process or formed in the field by cutting or otherwise separating a piece of the pipe from other portions of the pipe, such as in a middle portion. The bore 14 can be enlarged in some embodiments to an enlarged counterbore 16. A plug 18 can be inserted into the counterbore 16 (or bore 14) and coupled to the inside of the pipe 12 with a coupling 20. In general, the coupling 20 can be a weld, but can include other devices and methods for coupling as would be known to those with ordinary skill in the art. The plug 18 can be inserted into the bore by a distance X for the coupling. The distance X can be any value including zero (aligned with the end 24), a plus value (spaced inwardly along the counterbore 16 (or bore 14) from the end 24, or a minus value (protruding outward from the end 24). The distal end of the plug 18 from the end 24 establishes the distance Y to the end 24. The location of the plug 18 at the distance X and distance Y can be determined and recorded for later use, as necessary. The plug will generally be inserted and coupled to the pipe 12 prior to the pipe being overly stressed to otherwise cause the ovality. Thus, the plug 18 and related components can reduce the ovality being created from the stress and later be removed when the pipe 12 is prepared for coupling with another component.

Figure 3:
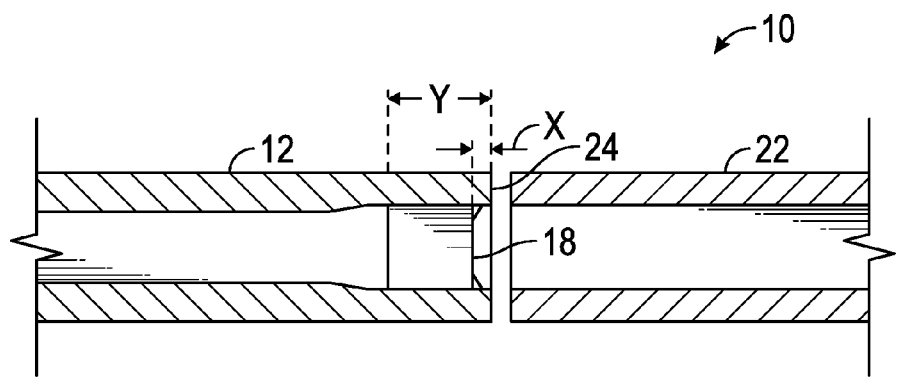
FIG. 3 is a cross-sectional schematic view of the pipe of FIG. 2 with a plug and a sacrificial component adjacent the pipe.

FIG. 3 is a cross-sectional schematic view of the pipe of FIG. 2 with a plug and a sacrificial component adjacent the pipe. Once the plug 18 is coupled to the pipe 12, a sacrificial component 22 can be brought in proximity to the end 24 for coupling thereto. The sacrificial component 22 can be any component that is suitable for the particular conditions being used. For example, the sacrificial component 22 can be another piece of pipe, where the combination of the pipe 12 and sacrificial component 22 might be further reeled onto a reel or used to extend the pipe 12, or for other purposes. Further, the sacrificial component 22 can be a portion of the pipe that originally was a portion of the pipe 12 before the pipe 12 was cut is to form an end 24. As an example, the pipe 12 could be cut in a middle portion to insert the plug 18 with the remainder of the pipe coupled back to the original pipe and a portion of the remainder used as a sacrificial component 22.

Figure 4:
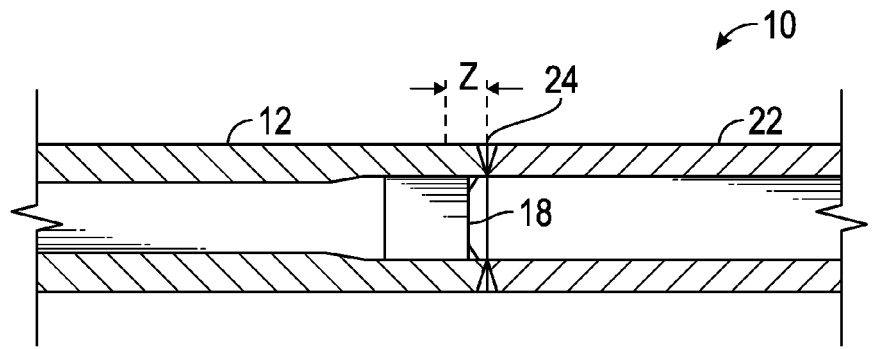
FIG. 4 is a cross-sectional schematic view of the pipe with the plug therein of FIG. 3, coupled with the sacrificial component.

FIG. 4 is a cross-sectional schematic view of the pipe with the plug therein of FIG. 3, coupled with the sacrificial component. The pipe 12 can be coupled with the sacrificial component 22 through welding, mechanical components, or other secure means with a plug 18 installed therein. The distance Z shown along the length of the pipe 12 is greater than the distance X where the plug is coupled to the pipe 12.

When it is appropriate to prepare the pipe 12 for coupling to a pipe component designed to be coupled to the pipe, the assembly of the pipe 12 and the sacrificial component 22 can be separated. The distance Z along the length of the pipe 12 that is greater than the distance X can be a location for the separation. While not limiting, the distance Z is generally between the distances X and Y along the pipe 12. The separation can occur in various manners customary to the industry, including cutting, sawing, shearing or other known manners. The coordination of the distance of Z being greater along the pipe 12 than the coupling distance X provides a location for separation that transfers the coupling of the plug with the pipe which at one time was independent of sacrificial component to a coupling with the sacrificial component that is independent of the pipe. Thus, the plug 18 has essentially been transferred from a coupling with the pipe 12 to a coupling with the sacrificial component 22. While the pipe 12 still may retain temporarily the plug 18 therein, the plug is no longer coupled in the same manner to the pipe 12 as it was shown in FIGS. 2 and 3. Now, the coupling of the plug is transferred to the sacrificial component 22 and the plug is slidably engaged with the pipe 12.

Figure 5:
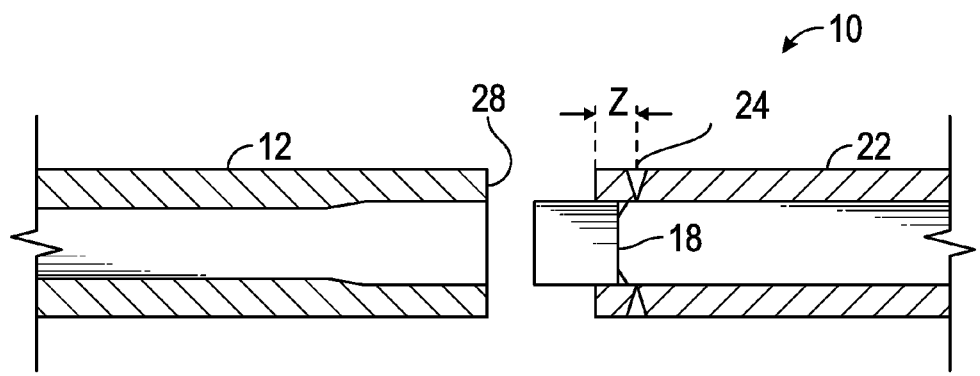
FIG. 5 is a cross-sectional schematic view of the pipe uncoupled from the sacrificial component with the plug coupled with the sacrificial component.

FIG. 5 is a cross-sectional schematic view of the pipe uncoupled from the sacrificial component with the plug coupled with the sacrificial component. With the separation of the pipe 12 from the pipe component 22, a new end 28 is formed. The new end 28 is formed at a distance Z from the original pipe end 24, where the pipe 12 was coupled with the sacrificial pipe 22. The sacrificial component 22 with the plug 18 coupled thereto can be removed with the sacrificial component from the inside of the pipe 12. The sacrificial component 22 with the plug 18 can be discarded, or if the sacrificial component 22 is part of or coupled with components that can be reused, such as a length of pipe, then the sacrificial component can be cut off or otherwise removed leaving the portion that is to be reused.

Figure 6:
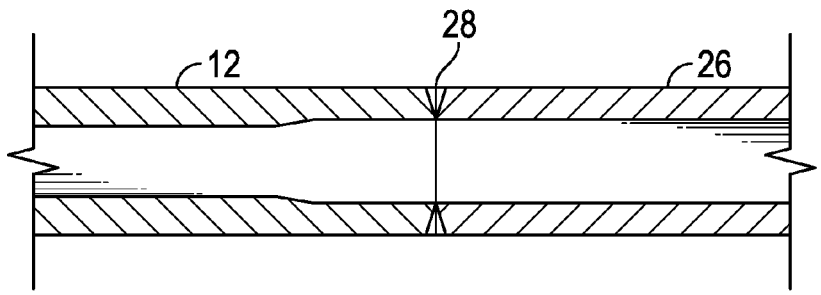
FIG. 6 is a cross-sectional schematic view of the pipe coupled with a component.

FIG. 6 is a cross-sectional schematic view of the pipe coupled with a component. A pipe component 26 can be coupled with the pipe 12 at the new end 28 of the pipe 12. The pipe component can be any suitable component, including pipe, stress joints, fittings, valves, and other components that can be attached to the pipe 12.

The following figures illustrate various embodiments of the plug 18. While the embodiments are not limited, the examples shown in the following figures can illustrate a few of the many embodiments for the plug.

Figure 7:
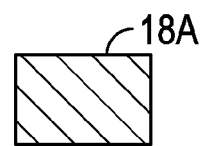
FIG. 7 is a cross-sectional schematic view of an exemplary plug.

FIG. 7 is a cross-sectional schematic view of an exemplary plug. The plug 18A is shown as a solid plug. In general, the plug 18A will have outside shape that is formed to fit within the counterbore 16 (or the bore 14) of the pipe 12 as described above. The plug 18A may have tapers, radii, and other form-fitting shapes (not shown) as would be known to those with ordinary skill in the art.

Figure 8:
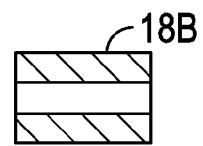
FIG. 8 is a cross-sectional schematic view of an exemplary plug.

FIG. 8 is a cross-sectional schematic view of an exemplary plug. The plug 18B is shown as a tube having a central hole therethrough. The plug 18B can have sufficient radial strength to resist compressive forces and other stresses that may be applied to the pipe 12 to cause the ovality issues described herein.

Figure 9:
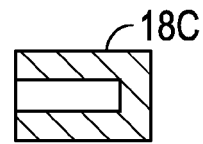
FIG. 9 is a cross-sectional schematic view of an exemplary plug.

FIG. 9 is a cross-sectional schematic view of an exemplary plug. Plug 18C is shown as a hollow plug having a circumferential wall with an end, and is essentially a combination of plugs 18A and 18B.

Figure 10:
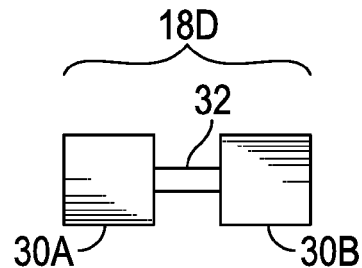
FIG. 10 is a cross-sectional schematic view of an exemplary plug having a plurality of portions coupled together.

FIG. 10 is a cross-sectional schematic view of an exemplary plug having a plurality of portions coupled together. The plug 18B can include the plurality of plug portions 30A, 30B that are connected by a coupler 32. The plug 18D can be useful for an extended length plug and can be formed from two of more such portions. The use of a plug 18D with separate portions that are coupled by a center member, such as the coupler 32, may be useful in the pipe 12 that has a longitudinal bend, where a single extended length plug might have difficulty with insertion and removal.

Other and further embodiments utilizing one or more aspects of the invention described above can be devised without departing from the spirit of Applicant's invention. For example, the plug can be made of various materials that are resistive to the stresses affecting ovality of the pipe, the length of the plug can vary depending on where the stress is expected to result in is ovality, the number and location of plugs can vary depending the stresses expected, and other variations in keeping within the scope of the claims.

Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

What is claimed is:

1. A method for reducing ovality changes in a pipe for coupling with a pipe component, the pipe having a plug inserted into a pipe end and fixedly coupled to the pipe at a coupling distance from the pipe end and the pipe further having a sacrificial component coupled to the pipe end, the method comprising:

separating a portion of the pipe from the pipe end coupled to the sacrificial component at a greater distance than the coupling distance, thereby causing the plug to be fixedly coupled to the sacrificial component and not fixedly coupled to the portion of the pipe that is separated from the pipe end; and removing the plug coupled with the sacrificial component out of an inside of the portion of the pipe separated from the pipe end coupled to the sacrificial component.

2. The method of claim 1, further comprising coupling the pipe component to the end of the pipe.

3. The method of claim 1, wherein the pipe has been pre-cut in a middle portion of the pipe to establish an end for insertion of the plug into the pipe and the sacrificial component comprises a portion of the pipe recoupled to the pipe.

4. The method of claim 1, wherein separating the portion of the pipe comprises separating pipe portion at a position that is greater than a distance of the coupling of the plug with the pipe but less than a distance to a distal end of the plug relative to the pipe end.

5. The method of claim 1, further comprising identifying a position of the plug in the pipe from the end of the pipe prior to coupling the sacrificial component to the pipe, and using that position to determine the distance for cutting the pipe portion.

6. The method of claim 1, wherein the plug is recessed inside the pipe longitudinally from the pipe end and coupled to the pipe.

7. The method of claim 1, further comprising preparing the pipe with the plug and sacrificial component, comprising:

inserting the plug into the pipe end of the pipe;

fixedly coupling the plug in the pipe; and coupling the sacrificial component with the end of the pipe.

* * * * *